US012753049B2

(12) United States Patent
Killion et al.

(10) Patent No.: US 12,753,049 B2
(45) Date of Patent: Oct. 6, 2026

(54) ELEVATOR DOOR ENFORCER

(71) Applicant: Ashby Elevator Safety Products, LLC, Glen Mills, PA (US)

(72) Inventors: Daniel Killion, Glen Mills, PA (US); Patrick Killion, Bensalem, PA (US); John Killion, Prospect Park, PA (US); Dan Ruprecht, Glen Mills, PA (US)

(73) Assignee: Ashby Elevator Safety Products, LLC, Glen Mills, PA (US)

( * ) Notice: Subject to any disclaimer, the term of this patent is extended or adjusted under 35 U.S.C. 154(b) by 0 days.

(21) Appl. No.: 19/422,284

(22) Filed: Dec. 16, 2025

(65) Prior Publication Data

US 2026/0103362 A1 Apr. 16, 2026

Related U.S. Application Data

(63) Continuation-in-part of application No. PCT/US2025/035775, filed on Jun. 27, 2025.

(60) Provisional application No. 63/666,150, filed on Jun. 29, 2024.

(51) Int. Cl.

*B66B 13/28* (2006.01)
*B66B 13/30* (2006.01)
*B66B 19/00* (2006.01)

(52) U.S. Cl.

CPC ............ *B66B 13/28* (2013.01); *B66B 13/303* (2013.01); *B66B 19/007* (2013.01)

(58) Field of Classification Search

CPC .............................. B66B 13/28; B66B 13/303
See application file for complete search history.

(56) References Cited

FOREIGN PATENT DOCUMENTS

| | | | | |
|---|---|---|---|---|
| CN | 205668860 | | 11/2016 | |
| CN | 113682927 | | 11/2021 | |
| CN | 215101400 | | 12/2021 | |
| JP | 2004099265 | | 4/2004 | |
| JP | 2012218882 | | 11/2012 | |
| KR | 100791107 | B1 * | 1/2008 | ............. E05B 65/08 |
| KR | 100946678 | | 3/2010 | |
| KR | 100972361 | | 7/2010 | |
| KR | 100972361 | B1 * | 7/2010 | |
| KR | 101781803 | | 10/2017 | |
| WO | WO-2008108556 | A1 * | 9/2008 | ........... B66B 13/301 |
| WO | WO-2022024376 | A1 * | 2/2022 | ............. B66B 13/30 |

OTHER PUBLICATIONS

Machine Translation of KR 10-0972361.*
International Search Report and Written Opinion of corresponding PCT Application No. PCT/US2025/035775, dated Oct. 29, 2025.

* cited by examiner

*Primary Examiner* — Diem M Tran
(74) *Attorney, Agent, or Firm* — Cozen O'Connor

(57) ABSTRACT

An elevator door enforcer may be used to enhance the safety of an elevator landing door. The device includes a pin, and a mechanical structure that affixes the pin securely to the elevator landing door. The pin is a protruding structure that may be positioned so that a portion of the pin protrudes from the affixation point, downwards past the bottom of the elevator landing door, and into a sill groove when the elevator door enforcer is in use.

20 Claims, 10 Drawing Sheets

ELEVATOR DOOR ENFORCER

PRIORITY

This Application is a continuation-in-part (CIP) of International Application No. PCT/US2025/035775 having an International Filing Date of Jun. 27, 2025, which claims the benefit of U.S. Provisional Application Ser. No. 63/666,150 filed 29 Jun. 2024, the disclosures of which (including the Appendices) are incorporated by reference herein.

TECHNICAL FIELD

Embodiments described herein generally relate to elevator safety and, more particularly, to preventing elevator landing door panels from inadvertently detaching at the bottom and exposing people to the risk of falling into the elevator hoistway when the door panels subjected to inward force.

BACKGROUND

An elevator hoistway is a vertical shaft constructed from reinforced concrete, steel, or masonry, designed to house the elevator car and counterweights while ensuring strength and fire resistance. Inside the hoistway, steel guide rails are anchored to the walls at regular intervals, providing smooth vertical travel for the elevator car and counterweights.

Landing door panels, typically made of steel or stainless steel for durability and fire resistance, may also feature glass panels for aesthetics and visibility. These doors can be single-slide, two-speed, or center-opening, depending on design and space requirements. The panels slide open and closed on metal tracks mounted at the top of the door frame. Nylon or similar durable, low-friction material runners are attached to the door panels to facilitate smooth movement along the tracks.

Mounted on top of the elevator car is the door operator, a motorized system that controls the opening and closing of both the elevator car doors and the landing doors simultaneously. This operator consists of a motor, gearbox, linkage arms, and a control system, ensuring the doors open and close smoothly, safely, and in sync with the elevator car's movements. At the floor level of each landing is the landing sill, a horizontal metal component serving as a threshold over which the elevator door panels slide. The sill provides a smooth surface for door movement and helps align the door with the elevator car for safe passenger entry and exit.

Conventionally, to keep the door panels from swinging inward into the hoistway or outward into the landing area, gibs—small brackets made of plastic or metal—are attached to the bottom of the landing door panels. These gibs slide along a guide groove in the landing sill, keeping the door panels aligned and secure during operation. Gibs are typically installed using machine screws (e.g., 10/32) which are driven into threaded holes of the door panels along an axis perpendicular to the motion of the door panels.

As part of a typical maintenance program, the gibs are periodically removed and inspected, and the plastic guides may be replaced. Ironically, despite the intended safety purpose of such maintenance, repeated removal and reinstallation of the screws used to attach the gibs to the door panels tends to weaken the threads of the screws, and holes in which those screws are installed, rendering the gibs less safe.

Tragically, there have been incidents where gib failures have led to serious accidents. One type of accident involves the complete detachment of the door panel from the guide groove due to gib failure. This can cause the door to swing into the hoistway and create a gap large enough for one or more persons to fit through and fall into the hoistway. All too often, the result of such accidents is fatal or severe injury due to the significant drop and presence of moving elevator machinery. In other cases, a failed gib can cause the door to misalign, trapping passengers between the door and the elevator car. These incidents can result in serious injuries as the door might close unexpectedly on passengers.

Practical solutions are needed to mitigate these, and other, risks associated with elevator door panels.

SUMMARY

One aspect of the disclosure is directed to an elevator door enforcer, which is a device that is constructed to be secured to an end or back edge of a landing door panel which travels on a rail over a sill. In some embodiments, the elevator door enforcer device comprises a downward-protruding pin, rigidly affixed to the landing door panel, that extends to a lower elevation than the bottom of the door panel, and into a sill groove, or channel formed in the sill. The pin travels with the door as the door opens and closes while remaining in the sill, thereby preventing the bottom of the door from swinging in a direction perpendicular to the door's opening (e.g., into the hoistway).

In some embodiments, the elevator door enforcer includes a block of material from which the pin protrudes. Some such embodiments provide for variable-height positioning of the pin within the block, whereas other embodiments have a fixed-height pin. In other embodiments, the block is omitted, and the pin is provided as part of the attachment structure of the elevator door enforcer.

In the present context, the pin is a downward protrusion that is securely affixed or integrated with the landing panel door, travels with the landing panel door, and extends into the sill groove. The pin may have a variety of shapes, including a generally cylindrical geometry. Other shapes and structures are contemplated as well, such as structures with rectangular, trapezoidal or other polygonal, triangular, elliptical, or irregular cross sections. The pin may have uniform dimensions along its length of protrusion, or it may have variable geometry along its length of protrusion. For instance, the pin may be tapered (e.g., having a pyramidal or conical shape).

In some embodiments, the elevator door enforcer device includes an attachment interface that extends from the block, and facilitates attachment of the device to or near the landing door panel's leading or back edge, at or near the bottom of the landing door. The attachment interface facilitates attachment of the elevator door enforcer in situ, without removing or disassembling the landing door.

The attachment interface may have various structures and geometries. For instance, the attachment interface may be a rectangular plate that extends from the back side of the block along a longitudinal axis. As another example, the attachment interface is an L-bracket with a first leg and a second leg, each leg comprising a rectangular plate that forms a right angle with the other leg. One of the legs of the L-bracket extends from the back side of the block along the longitudinal axis.

The attachment interface defines apertures through which fasteners may be inserted. Affixation of the attachment interface to the landing door panel may be accomplished using various fastener types, such as screws, bolts, rivets, or other suitable fastener type that passes through a corresponding aperture. In the case where threaded fasteners are used, the landing door panel may be drilled and tapped to accept the threaded fasteners. In some applications (such as where the landing door panels have a light-gauge sheet metal construction, rivet nuts may be installed in the door panel to receive mating screws. In other applications, as where access to the interior of the door panel is available, through-bolts with nuts may be used to fasten the interface plate to the landing door panel. In related embodiments, adhesive or welded attachment may be used (in which case the apertures may either remain unused or be omitted entirely from the attachment interface).

In some embodiments, the pin is height-adjustable. In such embodiments, the block facilitates retention and adjustment of the height-adjustable pin, that may be secured at an appropriate extent of protrusion (e.g., ensuring that the pin properly extends downward below the bottom of the landing door panel, and into the landing sill groove). The block and adjustable pin may be formed from stainless steel, tool steel, or other suitable material. The pin may be retained within a pin channel, with its height adjusted and fixable using a set screw.

In other embodiments, the pin height relative to the block is not adjustable. Instead, in this fixed-pin embodiment, the attachment interface facilitates adjustment of the vertical position of the elevator door enforcer. For example, the attachment interface may define slotted apertures with the slots oriented along the vertical direction. Before tightening the threaded fasteners, the vertical position of the elevator door enforcer may be set to position the fixed pin to protrude downward past the bottom of the landing door and into the sill groove.

In another type of embodiment, the elevator door enforcer may omit the block entirely. In one such implementation, the elevator door enforcer comprises a plate with slotted apertures as in the fixed-pin example. Instead of having a block, the plate includes a downward-protruding portion that is at the bottom end when the device is installed in its operational position. The downward-protruding portion extends past the bottom of the landing door panel and into the sill groove when the device is installed at a proper operative height. In the present context, the downward-protruding portion is one embodiment of a fixed-height pin.

In another related aspect, the elevator door enforcer is integrally assembled with the door panel. In such embodiments, the block may be situated in the interior of the panel proximate one or both of the bottom corners. The set screw may be accessed from either the edge or back face of the landing door.

In some aspects, the techniques described herein relate to an elevator door enforcer, including: a block defining a pin channel; a pin that is insertable into the pin channel; a pin retainer that engages with the pin to retain a position of the pin within the pin channel wherein a portion of the pin protrudes from the pin channel; and an attachment interface extending from the block and including an interface surface for contacting a leading or back edge of an elevator landing door panel.

In some aspects, the techniques described herein relate to a landing door panel, including: a leading edge and a back edge, a top edge, and a bottom edge; an elevator door enforcer situated proximate the bottom edge and proximate at least one of the leading edge and the back edge, the elevator door enforcer including: a block defining a pin channel; a pin that is insertable into the pin channel and translatable along the pin channel; a pin retainer that engages with the pin to retain a position of the pin within the pin channel wherein a portion of the pin protrudes from the pin channel beyond the bottom edge of the landing door panel.

In some aspects, the techniques described herein relate to a landing door system, including: a landing door panel suspended from a track over a sill, the landing door including a leading vertical edge and a back vertical edge, a top edge, and a bottom edge, the landing door panel being operatively translatable along the track along a direction of travel; the sill defining a sill groove along the direction of travel; an elevator door enforcer situated proximate the bottom edge of the landing door panel and proximate at least one of the leading vertical edge and the back vertical edge, the elevator door enforcer including: a block defining a pin channel; a pin that is insertable into the pin channel and translatable along the pin channel; a pin retainer that engages with the pin to retain a position of the pin within the pin channel wherein a portion of the pin protrudes from the pin channel beyond the bottom edge of the landing door panel and into the sill groove.

In some aspects, the techniques described herein relate to a method for installing an elevator door enforcer on an elevator door panel, wherein the elevator door enforcer includes a block defining a pin channel and a pin that is insertable into the pin channel, the method including: aligning the block of the elevator door enforcer with a vertical edge of the elevator door panel; affixing the block to the vertical edge of the elevator door panel; loosening a set screw that retains an adjustable pin of the elevator door enforcer; adjusting a position of the adjustable pin such that the pin extends vertically past a bottom of the elevator door panel; tightening the set screw to fix the position of the pin.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The following description and the drawings sufficiently illustrate specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Figure 1:
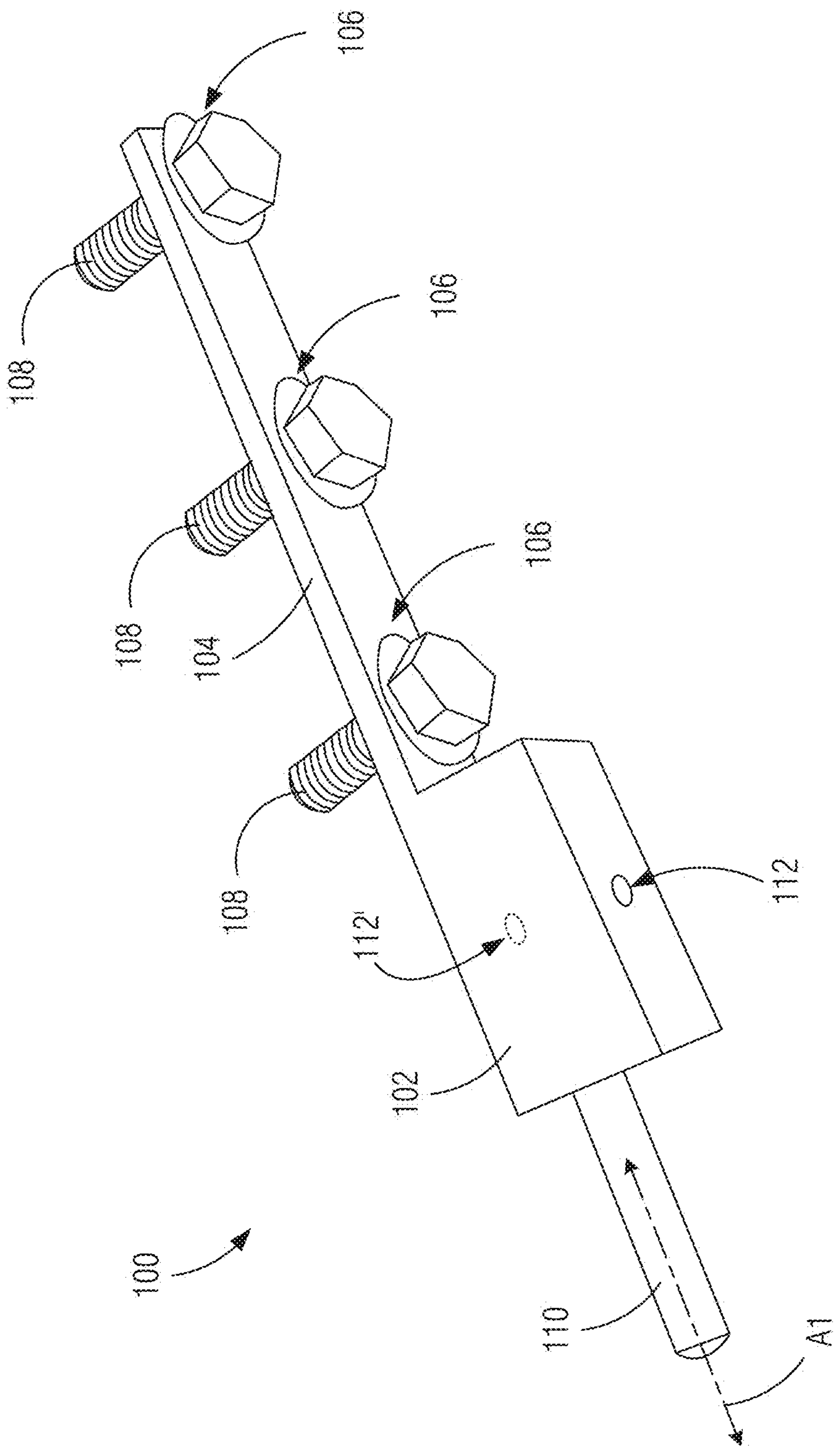
FIG. 1 is a perspective view of an elevator door enforcer according to an example embodiment.

FIG. 1 is a perspective view of an elevator door enforcer 100 according to an example embodiment. Enforcer 100 includes block 102, which comprises a bulk material. As shown in this example, block 102 has the shape of a rectangular prism with top, bottom, front, back, left, and right sides. However, in other implementations, block 102 may have other suitable shapes (e.g., rounded corners, arcuate sides).

Attachment interface in the form of interface plate 104 extends in the upward direction, along longitudinal axis A1, from the back side of block 102. In this example, interface plate 104 has a back surface which is coplanar with a back surface of block 102. As shown, interface plate 104 has a width that matches the width of block 102. Interface plate has the shape of a rectangular plate. However, the shape and dimensions of the attachment interface can take myriad other forms (e.g., it may have rounded corners, curved or compound edges, or other form factors).

Block 102 may be formed from a suitable stainless steel (e.g., 316, 465, 440C, 17-4 PH or 15-5 PH), or tool steel (e.g., 4142, O1, W1, D2, O2, A2, D3, D6, or the like). An example pin diameter is 0.25 inch, with an example length of 1.75 inches, although other suitable sizes are contemplated. Interface plate 104 defines apertures 106 through which fasteners 108 may pass. Elevator door enforcer 100 also includes adjustable pin 110, formed from the same or compatible material as block 102, which may be positioned along longitudinal axis A1 and secured in place via set screw 112 that is threadably engaged within a corresponding bore defined in block 102. Adjustable pin 110 fits inside pin channel 602 (FIG. 6), which is defined in block 102. For pin 110 that has a circular cross section, the pin channel 602 may have a cylindrical geometry. Set screw 112 protrudes into pin channel 602 to engage with a surface of pin 110 and hold pin 110 in place.

As shown, set screw 112 (with corresponding threaded bore 604—see FIG. 6) is defined in block 102 from the front face of block 102 and extending inward toward pin channel 602. As a variation, in some embodiments, set screw 112' (with corresponding threaded bore) is defined in block 102 from one or both side faces of block 102. Side-positioned set screw 112' may be used in lieu of set screw 112. In some embodiments, block 102 may be provided with threaded bores on the front and one or both sides of block 102 for set screws 112 and 112', respectively. In use, the installer may select which of the available threaded bores is to receive a set screw 112, 112'.

Fasteners 108, as shown in the example of FIG. 1, are screws with hexagonal heads and flat washers. In related embodiments, which fasteners 108 may be bolts, nuts, rivets, or other suitable fasteners, and they may be used with lock washers, thread-lock compound, or other securing provisions. As an example, fasteners 108 may have a thread designation of 5/16-18 UNC.

Figure 2:
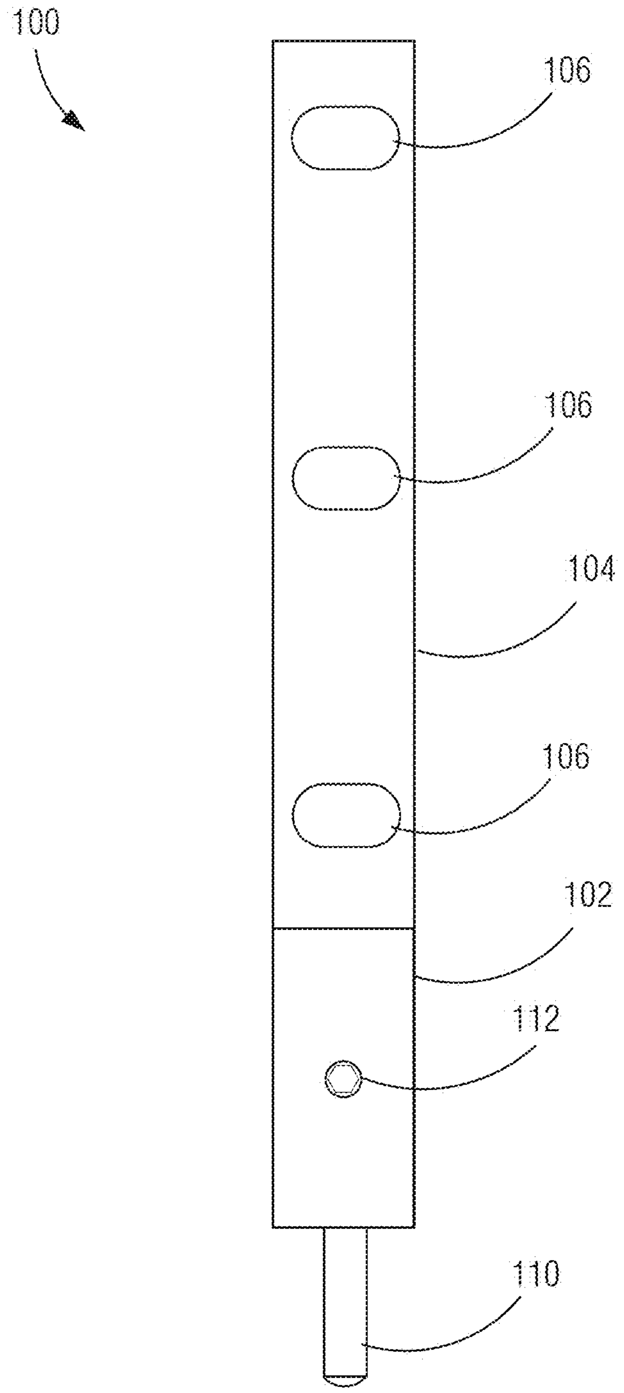
FIG. 2 is a front elevational view of the elevator door enforcer of FIG. 1 in which apertures are more clearly visible.

FIG. 2 is a front elevational view of elevator door enforcer 100 (with fasteners 108 not shown) in which apertures 106 are more clearly visible. In addition, set screw 112 is shown in greater detail. In this example, set screw 112 may be implemented as a hex screw which engages with a threaded bore 604 (FIG. 6) bore defined in block 102.

Figure 3:
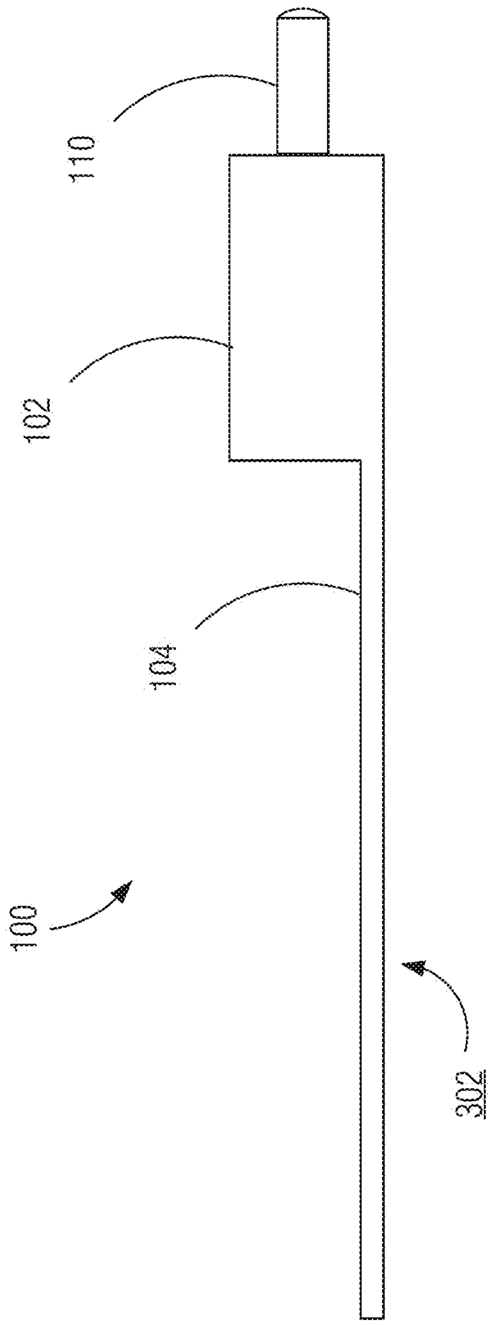
FIG. 3 is a side elevational view of elevator door enforcer of FIGS. 1-2.

FIG. 3 is a side elevational view of elevator door enforcer 100. Notably, interface plate 104 provides interface surface 302 for contacting a leading or back edge of an elevator landing door panel.

Figure 4:
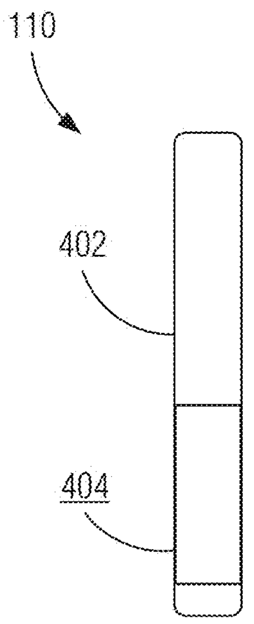
FIGS. 4 and 5 are, respectively, front and side views of a pin for use with the elevator door enforcer of FIGS. 1-3 according to an example embodiment.
Figure 5:
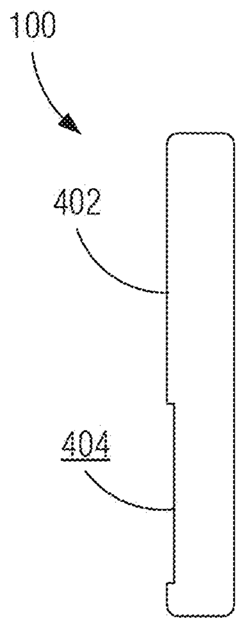

FIGS. 4 and 5 are, respectively, front and side views of pin 110 according to an example embodiment. Pin 110 may be made from a suitable type of hardened steel (e.g., 4142, O1, W1, D2, O2, A2, D3, and D6, or the like). Pin 110 has a generally cylindrical body 402, and an indented flat surface 404 with which set screw 112 engages. The length of indented flat surface 404 corresponds to the range of height adjustability of pin 110 within the pin channel 602 (FIG. 6).

Figure 6:
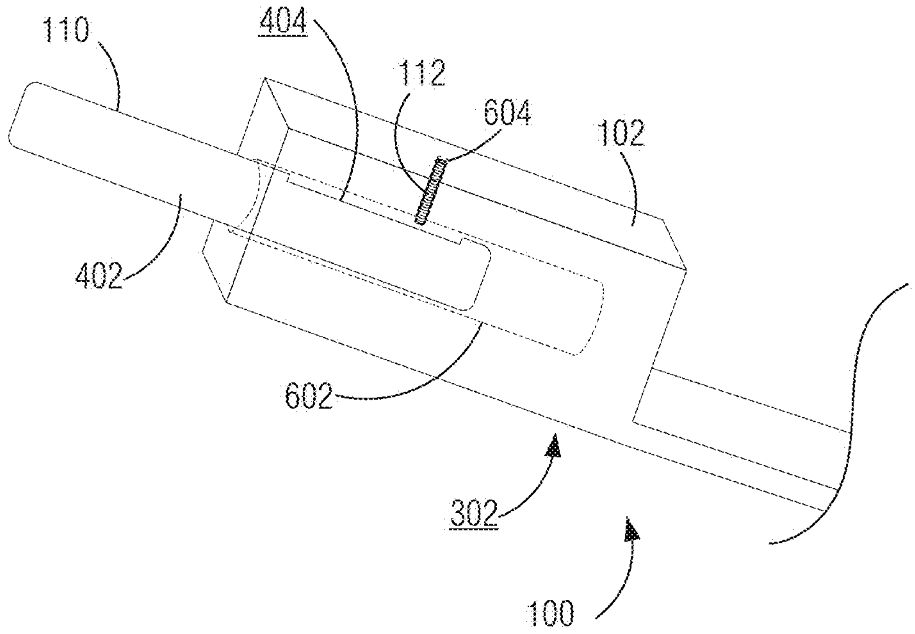
FIG. 6 is a partial perspective-view diagram illustrating a portion of the elevator door enforcer of FIGS. 1-3, with additional details of the installation of the pin shown.

FIG. 6 is a partial perspective-view diagram illustrating a portion of elevator door enforcer 100, including block 102 and pin 110 having generally cylindrical body 402 indented flat surface 404, inserted in pin channel 602. Set screw 112 is also shown, engaged in threaded bore 604, and extending into pin channel 602 to engage with indented flat surface 404 of pin 110 so as to retain pin 110 in block 102.

In some embodiments, elevator door enforcer 100, when installed in an operative position on a landing door panel, prevents displacement of the door panel top and bottom by more than 20 mm (0.8 in.) when the door panel is subjected to a force of 5000 N (1,125 lbf) in the direction of the hoistway applied at right angles to the panel over an area of 300 mm by 300 mm (12 in. by 12 in.) at the approximate center of the panel. The elevator door enforcer 100, in some embodiments, enables the landing door panel to also withstand, without detachment or permanent deformation, a force of 1000 N (225 lbf) applied upward at any point along the width of the door panel and, while this force is maintained, an additional force of 1100 N (250 lbf) applied at right angles to the door at the center of the panel, with this force distributed over an area of 300 mm by 300 mm (12 in. by 12 in.).

Figure 7:
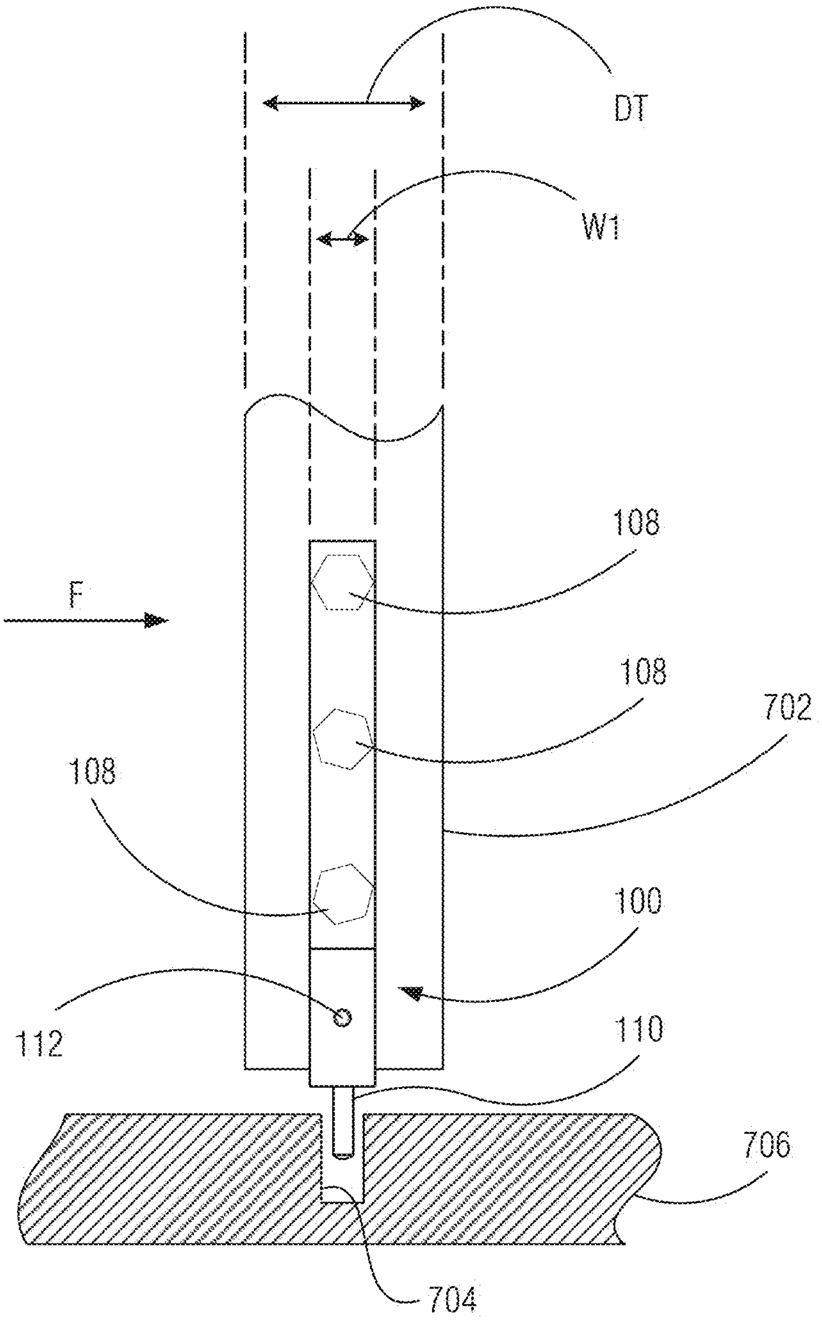
FIG. 7 is a front elevational view illustrating elevator door enforcer according to some embodiments, in a retrofit configuration, where it is affixed to an exterior end of landing door panel.

FIG. 7 is a front elevational view illustrating elevator door enforcer 100 in situ, in a retrofit configuration where it is affixed to an exterior end of landing door panel 702 via fasteners 108. Notably, block 102 of elevator door enforcer 100 has a form factor in its with dimension, W1, which is not greater than the door thickness DT of landing door panel 702. In some embodiments, the entire elevator door enforcer 100 has a width dimension which is smaller than door panel thickness DT. In related embodiments, the width dimension W1 may be greater than the thickness DT of landing door panel 702, but less than the clearance around landing door panel 702 such that elevator door enforcer 100 does not interfere with any structures such as door frames, walls, posts, or the like.

In this arrangement, the bottom of landing door panel 702 is kept in alignment with sill groove 704 by pin 110. Pin 110 is retained by set screw 112 and protrudes downward, as shown, into sill groove 704 of landing sill 706. Application of force F along a vector perpendicular to the major surface of landing door panel 702 (which, in the absence of elevator door enforcer 100, would cause the bottom of door panel 702 to swing along that vector—to the right as shown in FIG. 7) is opposed by the shear capacity of pin 110 and fasteners 108. Notably, the threads of fasteners 108 are not relied upon to oppose force F.

Likewise, set screw 112 plays no role in opposing force F. The role of set screw 112 is merely to retain pin 110 in block 102. The adjustability of the length of downward protrusion of pin 110 advantageously permits pin 110 to be retracted from sill groove 704, which may be needed for maintenance or repair of landing door panel 702 or other components of the elevator system.

Figure 8:
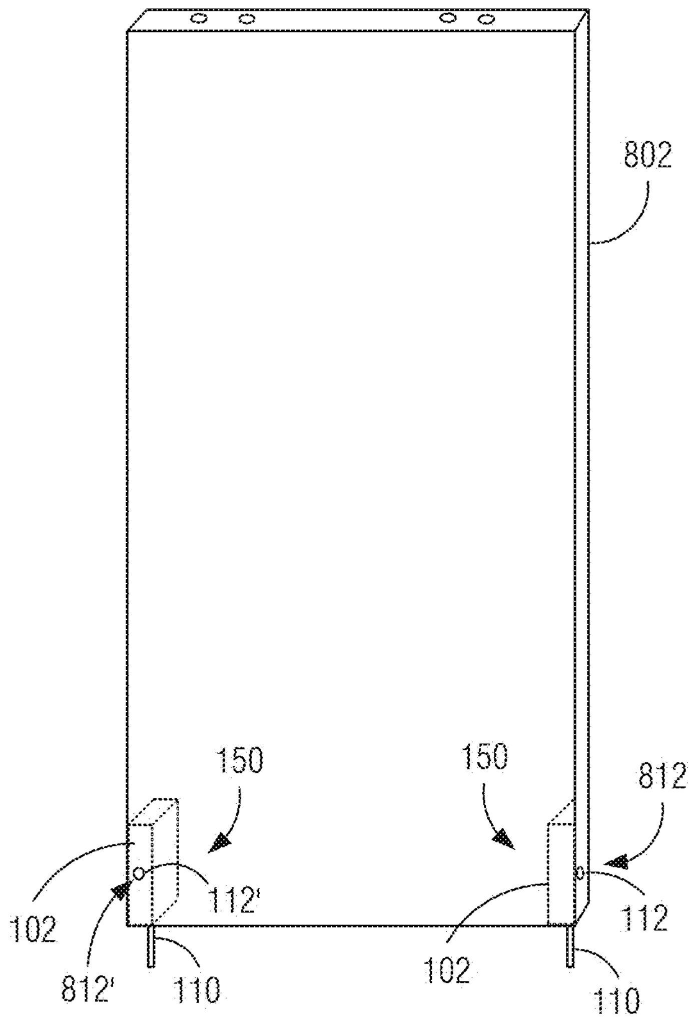
FIG. 8 is a simplified diagram illustrating an in-situ application of an elevator door enforcer according to an example embodiment.

FIG. 8 is a simplified diagram illustrating another in situ application of an elevator door enforcer according to an example embodiment. In this example, elevator door enforcer 150 is designed for installation in newly-manufactured landing door panels. Elevator door enforcer 150 is similar to elevator door enforcer 100 as described above, except that it may omit interface plate 104 (as depicted). In other embodiments, a different type of interface structure may be included as part of elevator door enforcer 150, such as a weld tab, alignment boss, or similar. Elevator door enforcer 150 may be installed as a component of landing door panel 802 at each of the bottom corners as depicted. Elevator door enforcer 150 may be welded to the frame of landing door panel 802, or secured with any suitable fastening provision (e.g., screws, bolts, rivets, tab-and-slot joint, or adhesive).

Elevator door enforcer 150 primarily comprises block 102, pin 110, and set screw 112, as these components are described above. The edge of landing door panel 802 may have an aperture 812 aligned with the location of set screw 112 to permit access to set screw 112 from the exterior of landing door panel 802. In related embodiments, set screw 112' which may be installed from the side of block 102 (i.e., perpendicularly to the major face of landing door panel 802) may be accessed through side aperture 812'.

In an alternative embodiment (not shown) elevator door enforcer 100 with interface plate 104 may be installed internally in landing door panel 802.

Figure 9B:
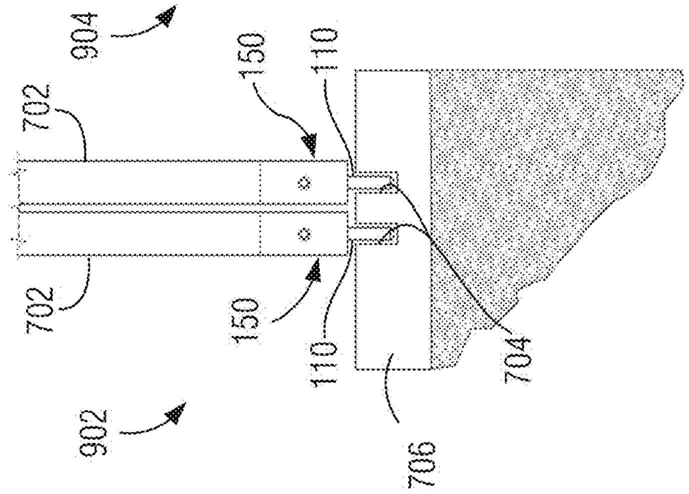
FIGS. 9A and 9B are diagrams illustrating in situ applications of an elevator door enforcer in single-speed and two-speed landing door configurations, respectively.
Figure 9A:
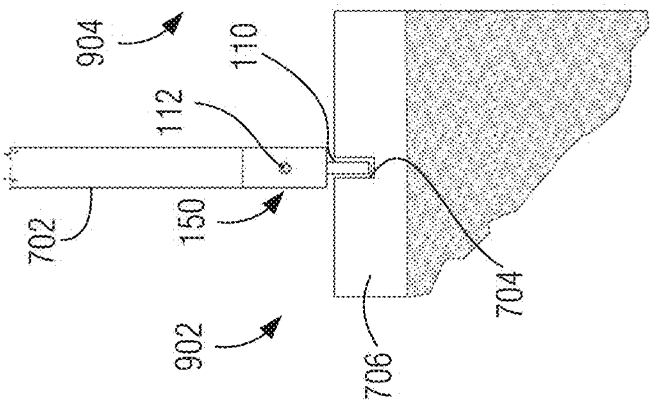

FIGS. 9A and 9B are diagrams illustrating in situ applications of elevator door enforcer 150 in single-speed and two-speed landing door configurations, respectively. As shown, landing door panel 702, is hung over a corresponding landing sill 706. The building landing 902 is on one side of the panel(s), and the open hoistway 904 on the other. Each elevator door enforcer 150 is situated at the back and leading edges of the door panels, and each pin 110 extends into respective sill groove 704.

Figure 10B:
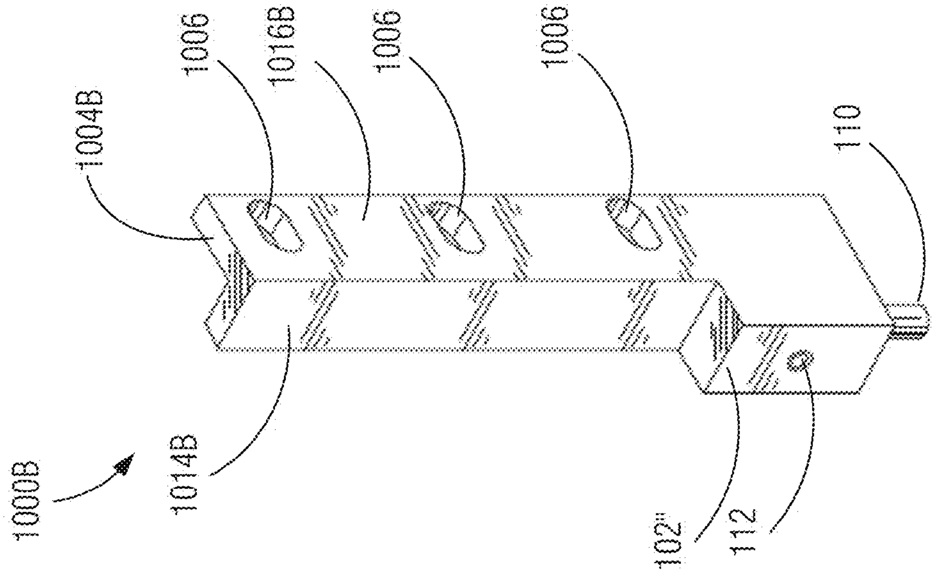
FIGS. 10A and 10B are diagrams illustrating a related type of embodiment of elevator door enforcer which is adapted for offset sill groove applications.
Figure 10A:
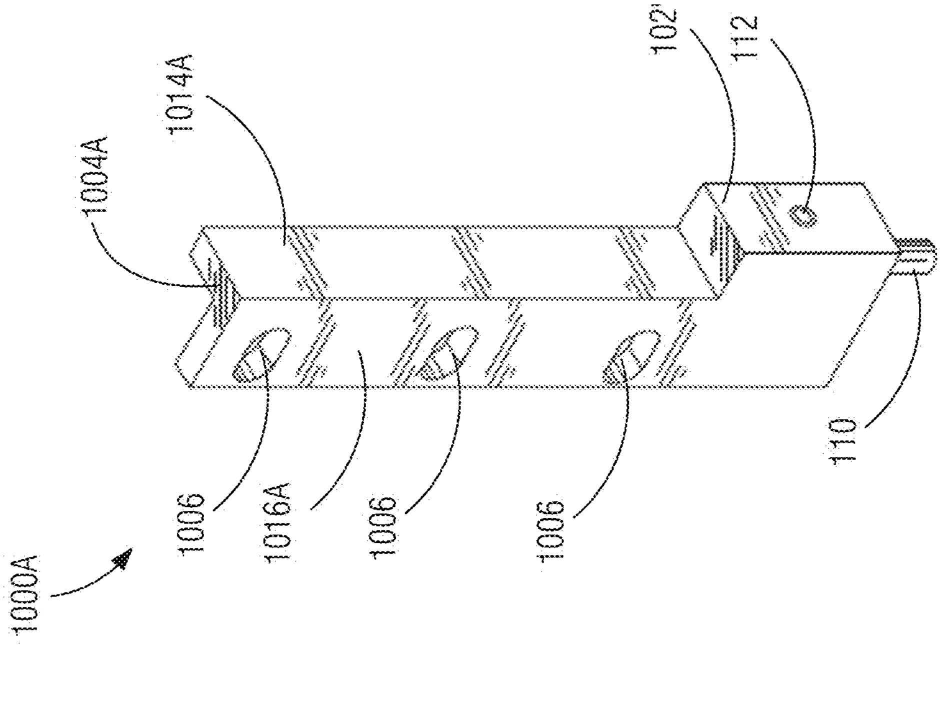

FIGS. 10A and 10B are diagrams illustrating a related type of embodiment of elevator door enforcer which is adapted for offset sill groove applications. FIG. 10A illustrates elevator door enforcer 1000A for a right-side-offset sill groove, whereas FIG. 10B illustrates elevator door enforcer 1000B for a left-side-offset sill groove. In this naming convention, right-side and left-side are relative to the landing door panel's edge to which elevator door enforcer 1000A, 1000B is to be attached.

Elevator door enforcer 1000A, 1000B includes block 102', 102", respectively, which in various embodiments, is similar to the embodiments of block 102 described above. Accordingly, each block 102', 102" includes pin 110, and set screw 112 (which may be oriented to be front-facing or side-facing). Instead of a single planar interface plate 104 as described above, elevator door enforcer 1000A, 1000B has an attachment interface that is an interface bracket 1004A, 1004B, respectively. As shown in the examples of FIGS. 10A and 10B, interface bracket 1004A, 1004B includes first leg 1014A, 1014B, and second leg 1016A, 1016B, respectively, as shown. First leg 1014A, 1014B forms an L-bracket with second leg 1016A, 1016B. Block 102', 102" is situated at the base of first leg 1014A, 1014B. Second leg 1016A, 1016B defines apertures 1006, which are analogous to apertures 106 as described above.

When in use, elevator door enforcer 1000A, 1000B is installed over the edge-back face (hoistway-side) junction at the bottom of landing door panel 702, with second leg 1016A, 1016B positioned against the edge of landing door panel 702. Fasteners 108 (or other fastening provision) is used to affix second leg 1016A, 1016B to the edge of landing door panel 702. This placement of elevator door enforcer 1000A, 1000B positions block 102', 102" inside the hoistway such that pin 110 is aligned over an offset sill groove.

Figure 11:
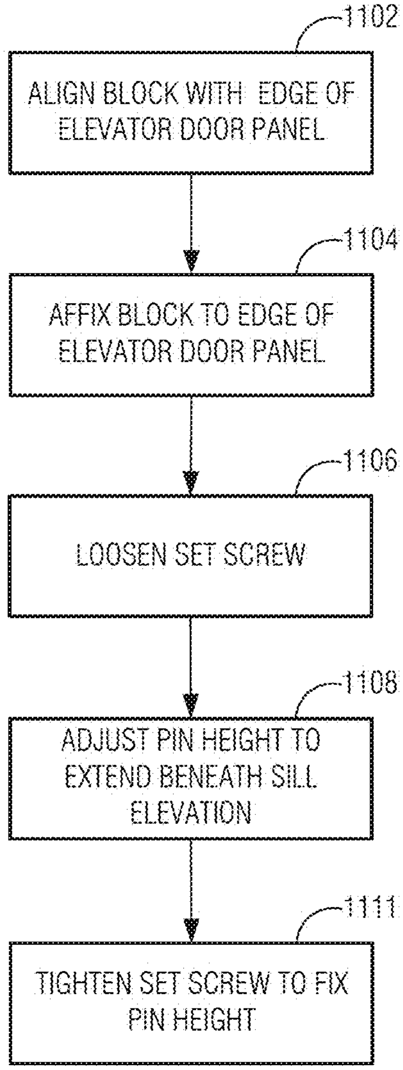
FIG. 11 is a flow diagram illustrating an example process of installing an elevator door enforcer on an elevator landing door panel as an in situ application.

FIG. 11 is a flow diagram illustrating an example process of installing elevator door enforcer 100 on an elevator landing door panel. The process may be employed in a retrofit application for in-situ installation of elevator door enforcer 100. At 1102, the block 102 of elevator door enforcer 100 is aligned with a first edge of the elevator door panel near the bottom of that edge. The edge is a leading or trailing edge (a typical installation is expected to have an elevator door enforcer 100 installed at both edges of each panel, though in some situations—as where one of the edges is inaccessible—only a single elevator door enforcer 100 may be installed).

At 1104, block 102 of elevator door enforcer 100 is affixed to the edge of the panel at the aligned location. Affixing may involve marking, drilling, and tapping threaded holes for fasteners 108 which may pass through interface plate 104. In some implementations, self-tapping screws may be used as fasteners 108, which can obviate the separate drilling and tapping operations. In other embodiments, affixing involves application of adhesive, such as a suitable epoxy, for instance. In other embodiments, affixing involves installation of rivets or other fasteners. In still other embodiments, affixation may be accomplished by welding.

At 1106, set screw 112 is loosened to permit adjustment of pin 110. At 1108, pin 110 is positioned at the appropriate height. In general, the appropriate height (i.e., downward protrusion length) is such that pin 110 extends below the top elevation of the landing sill. In typical scenarios, this means that pin 110 extends into a sill groove. At 1110, set screw 112 is tightened to engage with pin 110 in order to retain pin 110 at the set protrusion length.

The process may be repeated for any additional edges of the landing door panel(s).

Advantageously, the installation of elevator door enforcer 100 provides a strong, reliable, and simple means for retaining the bottom of the landing door panel along its plane of movement, thereby preventing the door panel from swinging perpendicular to that plane in response to an applied external force (e.g., people or objects colliding with the landing door panel). The landing door panel is retained to withstand such an applied force without reliance on the strength or condition of any fastener threads. Instead, the applied force is withstood by the shear capacity of pin 110 and shear capacity of fasteners 108 (or shear capacity of the affixation of elevator door enforcer 100 to the door panel), and the strength of block 102. With the use of suitable materials, such as hardened steel, the strength of elevator door enforcer 100 and its installation is sufficient to oppose any potential force which may be directed into the hoistway from the landing area.

Other, simpler (lower-cost), types of embodiments are contemplated as well. In some simpler embodiments, the pin height relative to the block is not adjustable. Instead, in this fixed-pin embodiment, the attachment interface facilitates adjustment of the vertical position of the elevator door enforcer. For example, the attachment interface may define slotted apertures with the slots oriented along the vertical direction. Before tightening the threaded fasteners, the vertical position of the elevator door enforcer may be set to position the fixed pin to protrude downward past the bottom of the landing door and into the sill groove.

Figure 12:
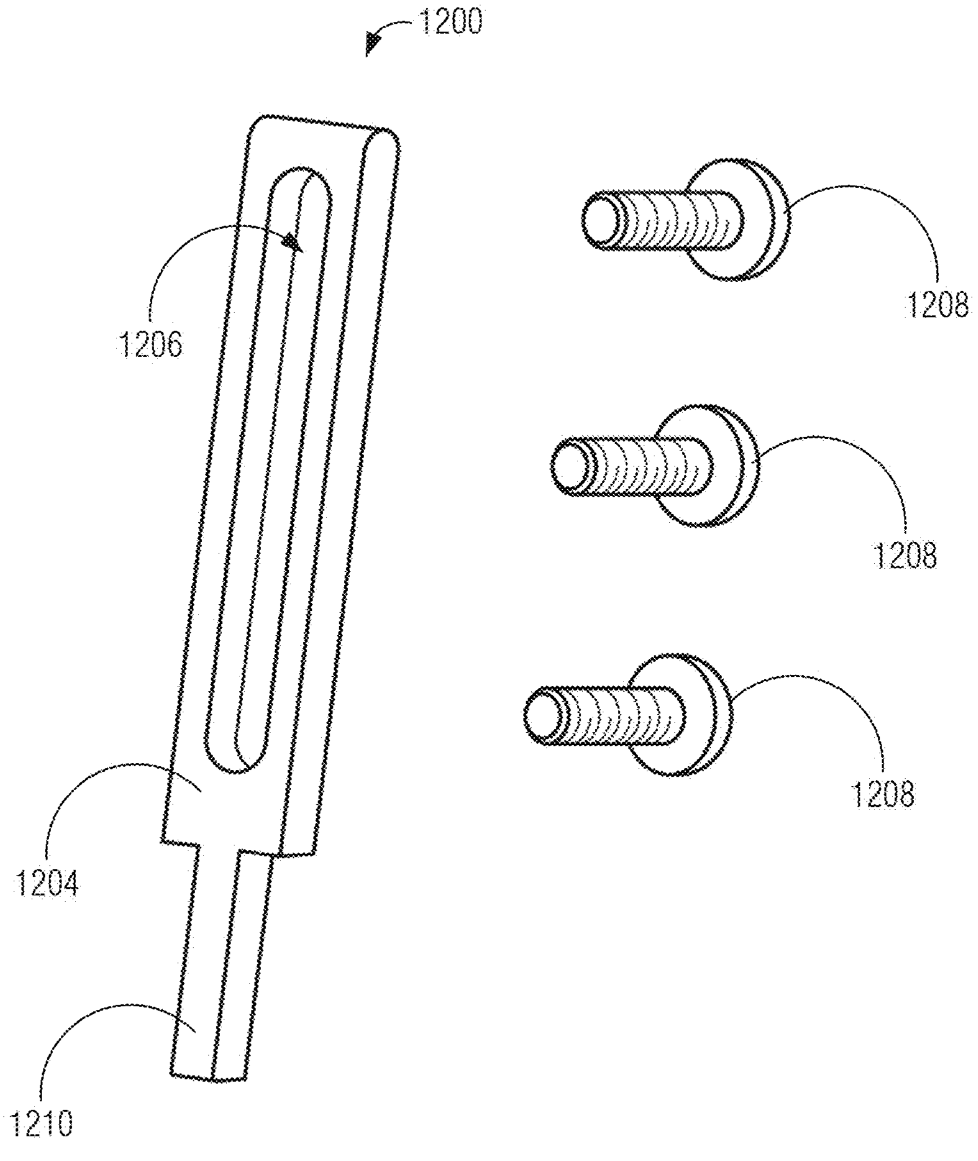
FIG. 12 is a diagram illustrating a simplified embodiment of an elevator door enforcer.

In another type of simpler embodiment, the elevator door enforcer may omit the block entirely. One such implementation is illustrated in FIG. 12. As depicted, simplified elevator door enforcer 1200 comprises plate 1204 with one or more slotted apertures 1206 (one is shown in the illustrated example). Aperture(s) 1206 may be elongate in the vertical direction to facilitate vertical height adjustment during installation of simplified elevator door enforcer 1200.

Fasteners 1208, such as screws, bolts, rivets, or the like, may pass through aperture(s) 1206. Instead of having a block as described in embodiments above, plate 1204 of simplified elevator door enforcer 1200 includes a downward-protruding portion 1210 that is at the bottom end when the device is installed in its operational position. Plate 1204 and downward-protruding portion 1210 may be integrally formed from a single piece of material, e.g., steel rod. The material may be a hardened steel of a type described above, or a different suitable type, which can withstand specified sheer forces without deforming to enable the door panel to withstand the forces described above.

The downward-protruding portion 1210 has a width which is narrower than the width of the upper part of simplified elevator door enforcer 1200 so that downward-protruding portion 1210 may extend past the bottom of the landing door panel and fit into the sill groove when the device is installed at a proper operative height. In the present context, the downward-protruding portion may be considered to be one type of embodiment of a fixed-height pin.

ADDITIONAL NOTES AND EXAMPLES

Example 1 is an elevator door enforcer, comprising: a block defining a pin channel; a pin that is insertable into the pin channel; a pin retainer that engages with the pin to retain a position of the pin within the pin channel wherein a portion of the pin protrudes from the pin channel; and an attachment interface extending from the block and including an interface surface for contacting a leading or back edge of an elevator landing door panel.

In Example 2, the subject matter of Example 1 includes, wherein the block has front, back, top, bottom, left, and right sides.

In Example 3, the subject matter of Examples 1-2 includes, wherein the attachment interface defines at least one aperture through which a fastener is insertable.

In Example 4, the subject matter of Examples 1-3 includes, wherein the attachment interface comprises an interface plate that has a back surface coplanar with a back surface of the block.

In Example 5, the subject matter of Examples 1-3 includes, wherein the attachment interface comprises an interface bracket comprising a first leg and a second leg, the first leg having a back surface coplanar with a back surface of the block, and the second leg having a back surface substantially perpendicular to the back surface of the block.

In Example 6, the subject matter of Examples 1-5 includes, wherein the block has a form factor which is not greater than a thickness of the elevator landing door panel.

In Example 7, the subject matter of Examples 1-6 includes, wherein the pin retainer includes a set screw.

In Example 8, the subject matter of Example 7 includes, wherein the pin set screw is engaged with a threaded bore defined in the block.

In Example 9, the subject matter of Example 8 includes, wherein the threaded bore is oriented perpendicular to a front face of the block.

In Example 10, the subject matter of Examples 8-9 includes, wherein the threaded bore is oriented perpendicular to a side face of the block.

In Example 11, the subject matter of Examples 1-10 includes, wherein the pin channel is oriented along a longitudinal axis, and wherein the attachment interface extends from the block along the longitudinal axis.

Example 12 is a landing door panel, comprising: a leading edge and a back edge, a top edge, and a bottom edge; an elevator door enforcer situated proximate the bottom edge and proximate at least one of the leading edge and the back edge, the elevator door enforcer including: a block defining a pin channel; a pin that is insertable into the pin channel and translatable along the pin channel; a pin retainer that engages with the pin to retain a position of the pin within the pin channel wherein a portion of the pin protrudes from the pin channel beyond the bottom edge of the landing door panel.

In Example 13, the subject matter of Example 12 includes, wherein the block has front, back, top, bottom, left, and right sides.

In Example 14, the subject matter of Examples 12-13 includes, wherein the elevator door enforcer further includes an attachment interface extending from the block and including an interface surface coplanar with a back side of the block.

In Example 15, the subject matter of Example 14 includes, wherein the attachment interface defines at least one aperture through which a fastener is insertable.

In Example 16, the subject matter of Examples 14-15 includes, wherein the attachment interface comprises an interface plate that has the back surface coplanar with a back surface of the block.

In Example 17, the subject matter of Examples 14-15 includes, wherein the attachment interface comprises an interface bracket comprising a first leg and a second leg, the first leg having a back surface coplanar with a back surface of the block, and the second leg having a back surface substantially perpendicular to the back surface of the block.

In Example 18, the subject matter of Examples 12-17 includes, wherein the block has a form factor which is not greater than a thickness of the elevator landing door panel.

In Example 19, the subject matter of Examples 12-18 includes, wherein the block is situated in the interior of the landing door panel.

In Example 20, the subject matter of Examples 12-19 includes, wherein the pin retainer includes a set screw.

In Example 21, the subject matter of Example 20 includes, wherein the pin set screw is engaged with a threaded bore defined in the block.

In Example 22, the subject matter of Example 21 includes, wherein the threaded bore is oriented perpendicular to a front face of the block, and wherein the threaded bore is open to an exterior of the landing door panel.

In Example 23, the subject matter of Examples 21-22 includes, wherein the threaded bore is oriented perpendicular to a side face of the block, and wherein the threaded bore is open to an exterior of the landing door panel.

In Example 24, the subject matter of Examples 12-23 includes, wherein the pin channel is oriented along a longitudinal axis.

Example 25 is a landing door system, comprising: a landing door panel suspended from a track over a sill, the landing door comprising a leading vertical edge and a back vertical edge, a top edge, and a bottom edge, the landing door panel being operatively translatable along the track along a direction of travel; the sill defining a sill groove along the direction of travel; an elevator door enforcer situated proximate the bottom edge of the landing door panel and proximate at least one of the leading vertical edge and the back vertical edge, the elevator door enforcer including: a block defining a pin channel; a pin that is insertable into the pin channel and translatable along the pin channel; a pin retainer that engages with the pin to retain a position of the pin within the pin channel wherein a portion of the pin protrudes from the pin channel beyond the bottom edge of the landing door panel and into the sill groove.

In Example 26, the subject matter of Example 25 includes, wherein the block has front, back, top, bottom, left, and right sides.

In Example 27, the subject matter of Examples 25-26 includes, wherein the elevator door enforcer further includes an attachment interface extending from the block and including an interface surface coplanar with a back side of the block.

In Example 28, the subject matter of Example 27 includes, wherein the attachment interface defines at least one aperture through which a fastener is insertable.

In Example 29, the subject matter of Examples 27-28 includes, wherein the attachment interface comprises an interface plate that has the back surface coplanar with a back surface of the block.

In Example 30, the subject matter of Examples 27-28 includes, wherein the attachment interface comprises an interface bracket comprising a first leg and a second leg, the first leg having a back surface coplanar with a back surface of the block, and the second leg having a back surface substantially perpendicular to the back surface of the block.

In Example 31, the subject matter of Examples 25-30 includes, wherein the block has a form factor which is not greater than a thickness of the elevator landing door panel.

In Example 32, the subject matter of Examples 25-31 includes, wherein the block is situated in the interior of the landing door panel.

In Example 33, the subject matter of Examples 25-32 includes, wherein the pin retainer includes a set screw.

In Example 34, the subject matter of Example 33 includes, wherein the pin set screw is engaged with a threaded bore defined in the block.

In Example 35, the subject matter of Example 34 includes, wherein the threaded bore is oriented perpendicular to a front face of the block, and wherein the threaded bore is open to an exterior of the landing door panel.

In Example 36, the subject matter of Examples 34-35 includes, wherein the threaded bore is oriented perpendicular to a side face of the block, and wherein the threaded bore is open to an exterior of the landing door panel.

In Example 37, the subject matter of Examples 25-36 includes, wherein the pin channel is oriented along a longitudinal axis that is perpendicular to the sill groove.

Example 38 is a method for installing an elevator door enforcer on an elevator door panel, wherein the elevator door enforcer includes, a block defining a pin channel and a pin that is insertable into the pin channel, the method comprising: aligning the block of the elevator door enforcer with a vertical edge of the elevator door panel; affixing the block to the vertical edge of the elevator door panel; loosening a set screw that retains an adjustable pin of the elevator door enforcer; adjusting a position of the adjustable pin such that the pin extends vertically past a bottom of the elevator door panel; tightening the set screw to fix the position of the pin.

In Example 39, the subject matter of Example 38 includes, wherein affixing the block to the vertical edge of the elevator door panel includes inserting a threaded fastener through an aperture of an attachment interface extending from the block and including an interface surface coplanar with a back side of the block.

In Example 40, the subject matter of Examples 38-39 includes, wherein in aligning the block of the elevator door enforcer with a vertical edge of the elevator door panel, the vertical edge of the elevator door panel is a leading or a back edge.

Example 41 is a landing door panel to be translationally installed over a sill groove, the landing door panel comprising: a leading edge and a back edge, a top edge, and a bottom edge; an elevator door enforcer situated proximate the bottom edge and adjacent at least one of the leading edge and the back edge, the elevator door enforcer including: a downward-protruding portion that protrudes past the bottom edge of the landing door panel such that, when the landing door panel is installed over the sill groove, the downward-protruding portion extends into the sill groove to prevent displacement of the bottom edge of the landing door panel in a direction perpendicular to the sill groove by more than a width of the sill groove.

In Example 42, the subject matter of Example 41 includes, wherein the elevator door enforcer further includes: a block defining a pin channel; a pin that is insertable into the pin channel and translatable along the pin channel, wherein the downward-protruding portion comprises at least a lower portion of the pin; and a pin retainer that engages with an upper portion of the pin to retain that upper position of the pin within the pin channel.

In Example 43, the subject matter of Example 42 includes, wherein the block is situated in the interior of the landing door panel.

In Example 44, the subject matter of Examples 41-43 includes, wherein the pin retainer includes a set screw.

In Example 45, the subject matter of Example 44 includes, wherein the pin set screw is engaged with a threaded bore defined in the block.

In Example 46, the subject matter of Examples 41-45 includes, wherein the elevator door enforcer further includes an attachment interface that is attached to the at least one of the leading edge and the back edge.

In Example 47, the subject matter of Example 46 includes, wherein the attachment interface defines at least one aperture through which a fastener is insertable.

In Example 48, the subject matter of Examples 46-47 includes, wherein the attachment interface comprises an interface plate.

In Example 49, the subject matter of Examples 46-48 includes, wherein the attachment interface comprises an interface bracket comprising a first leg and a second leg, the first leg having a back surface parallel with the at least one of the leading edge and the back edge, and the second leg having a back surface substantially perpendicular to the back surface of the first leg.

In Example 50, the subject matter of Examples 41-49 includes, wherein the elevator door enforcer has a form factor which is not greater than a thickness of the elevator landing door panel.

Conclusion

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An elevator door enforcer, comprising:
- a block defining a pin channel;
- a pin that is insertable into the pin channel;
- a pin retainer that engages with the pin to retain a position of the pin within the pin channel wherein a portion of the pin protrudes from the pin channel; and
- an attachment interface extending from the block and including an interface surface for contacting a leading or back edge of an elevator landing door panel.

2. The elevator door enforcer of claim 1, wherein the attachment interface defines at least one aperture through which a fastener is insertable.

3. The elevator door enforcer of claim 1, wherein the attachment interface comprises an interface plate that has a back surface coplanar with a back surface of the block.

4. The elevator door enforcer of claim 1, wherein the attachment interface comprises an interface bracket comprising a first leg and a second leg, the first leg having a back surface coplanar with a back surface of the block, and the second leg having a back surface substantially perpendicular to the back surface of the block.

5. The elevator door enforcer of claim 1, wherein the block has a form factor which is not greater than a thickness of the elevator landing door panel.

6. The elevator door enforcer of claim 1, wherein the pin retainer includes a set screw.

7. The elevator door enforcer of claim 1, wherein the pin channel is oriented along a longitudinal axis, and wherein the attachment interface extends from the block along the longitudinal axis.

8. A landing door panel to be translationally installed over a sill groove, the landing door panel comprising:
- a set of walls comprising a first face parallel to a second face, a leading edge parallel to a back edge, and a top edge, parallel to a bottom edge, wherein the first face is orthogonal to the leading edge and the top edge, and wherein the leading edge is orthogonal to the top edge;
- an elevator door enforcer situated proximate the bottom edge and abutting at least one of the leading edge and the back edge, the elevator door enforcer including:
  - a downward-protruding portion that protrudes past the bottom edge of the landing door panel such that, when the landing door panel is installed over the sill groove, the downward-protruding portion extends into the sill groove to prevent displacement of the bottom edge of the landing door panel in a direction perpendicular to the sill groove by more than a width of the sill groove.

9. The landing door panel of claim 8, wherein the elevator door enforcer further includes:
- a block defining a pin channel;
- a pin that is insertable into the pin channel and translatable along the pin channel, wherein the downward-protruding portion comprises at least a lower portion of the pin; and
- a pin retainer that engages with an upper portion of the pin to retain that upper position of the pin within the pin channel.

10. The landing door panel of claim 9, wherein the block is situated in the interior of the landing door panel.

11. The landing door panel of claim 8, wherein the pin retainer includes a set screw.

12. The landing door panel of claim 11, wherein the pin set screw is engaged with a threaded bore defined in the block.

13. The landing door panel of claim 8, wherein the elevator door enforcer further includes an attachment interface that is attached to the at least one of the leading edge and the back edge.

14. The landing door panel of claim 13, wherein the attachment interface defines at least one aperture through which a fastener is insertable.

15. The landing door panel of claim 13, wherein the attachment interface comprises an interface plate.

16. The landing door panel of claim 13, wherein the attachment interface comprises an interface bracket comprising a first leg and a second leg, the first leg having a back surface parallel with the at least one of the leading edge and the back edge, and the second leg having a back surface substantially perpendicular to the back surface of the first leg.

17. The landing door panel of claim 8, wherein the elevator door enforcer has a form factor which is not greater than a thickness of the elevator landing door panel.

18. A method for installing an elevator door enforcer on an elevator door panel, wherein the elevator door enforcer includes a block defining a pin channel and a pin that is insertable into the pin channel, the method comprising:

aligning the block of the elevator door enforcer with a vertical edge of the elevator door panel;

affixing the block to the vertical edge of the elevator door panel;

loosening a set screw that retains an adjustable pin of the elevator door enforcer;

adjusting a position of the adjustable pin such that the pin extends vertically past a bottom of the elevator door panel; and tightening the set screw to fix the position of the pin.

19. The method of claim 18, wherein affixing the block to the vertical edge of the elevator door panel includes inserting a threaded fastener through an aperture of an attachment interface extending from the block and including an interface surface coplanar with a back side of the block.

20. The method of claim 18, wherein in aligning the block of the elevator door enforcer with a vertical edge of the elevator door panel, the vertical edge of the elevator door panel is a leading or a back edge.

* * * * *